(12) United States Patent
Murata et al.

(10) Patent No.: US 10,626,823 B2
(45) Date of Patent: Apr. 21, 2020

(54) EXHAUST HEAT RECOVERY UNIT

(71) Applicants: Toshio Murata, Toyota (JP); Yoshihiro Koga, Gifu (JP)

(72) Inventors: Toshio Murata, Toyota (JP); Yoshihiro Koga, Gifu (JP)

(73) Assignees: TOYOTA JIDOSHA KABUSHIKI KAISHA, Toyota (JP); IBIDEN CO., LTD., Ogaki-shi (JP)

( * ) Notice: Subject to any disclaimer, the term of this patent is extended or adjusted under 35 U.S.C. 154(b) by 0 days.

(21) Appl. No.: 16/051,803

(22) Filed: Aug. 1, 2018

(65) Prior Publication Data

US 2019/0093599 A1 Mar. 28, 2019

(30) Foreign Application Priority Data

Sep. 27, 2017 (JP) .................................. 2017-186509

(51) Int. Cl.
*F01N 13/18* (2010.01)
*F02G 5/02* (2006.01)
*F01N 5/02* (2006.01)

(52) U.S. Cl.
CPC ................. *F02G 5/02* (2013.01); *F01N 5/02* (2013.01); *F01N 13/1838* (2013.01); *F01N 13/1894* (2013.01); *F01N 2240/02* (2013.01); *F01N 2470/10* (2013.01)

(58) Field of Classification Search
CPC ............... F01N 3/0205; F01N 13/1811; F01N 13/1838; F02M 26/29
See application file for complete search history.

(56) References Cited

U.S. PATENT DOCUMENTS

| | | | |
|---|---|---|---|
| 2015/0292812 A1* | 10/2015 | Tomita | F28F 1/40 165/177 |
| 2015/0329760 A1* | 11/2015 | Mori | C09K 5/14 165/51 |
| 2018/0298803 A1 | 10/2018 | Murata et al. | |

FOREIGN PATENT DOCUMENTS

| | | |
|---|---|---|
| CN | 105089861 A | 11/2015 |
| CN | 108730000 A | 11/2018 |
| JP | 2015-102051 A | 6/2015 |
| JP | 2016-223717 A | 12/2016 |

* cited by examiner

*Primary Examiner* — Jonathan R Matthias
(74) *Attorney, Agent, or Firm* — Oliff PLC

(57) ABSTRACT

An exhaust heat recovery unit, includes: a heat exchanger that is provided inside an exhaust pipe through which exhaust gas flows, the heat exchange being formed from silicon carbide, and the heat exchanger performing heat exchange between the exhaust gas and a heat medium; and a retention member that is provided at the periphery of the heat exchanger, is formed of a ceramic sheet or an expandable graphite sheet, and is sandwiched between the exhaust pipe and the heat exchanger, thereby retaining the heat exchanger in the exhaust pipe.

4 Claims, 3 Drawing Sheets

EXHAUST HEAT RECOVERY UNIT

CROSS-REFERENCE TO RELATED APPLICATION

This application is based on and claims priority under 35 USC 119 from Japanese Patent Application No. 2017-186509 filed on Sep. 27, 2017, which is incorporated by reference herein.

BACKGROUND

Technical Field

The present disclosure relates to an exhaust heat recovery unit.

Related Art

Japanese Patent Application Laid-open (JP-A) No. 2016-223717 discloses a heat exchanger where a metal band that uses a metal such as stainless steel (SUS) is interposed between a ceramic honeycomb structure and a case. By installing the heat exchanger of JP-A No. 2016-223717 in an automobile, exhaust gas and a heat medium such as a coolant can be made to flow in cells of the honeycomb structure and exchange heat.

Here, when the engine is stopped, normally the flow of the coolant (heat medium) inside the heat exchanger stops. Additionally, in a case where the engine has been stopped after high-load travel, there is the concern that, when the heat of the exhaust pipe that has reached a high temperature because of the exhaust gas at the time of the high-load travel is transmitted to the heat exchanger, the coolant (heat medium) that has stopped flowing will boil. Particularly in a configuration where, as in JP-A No. 2016-223717, a metal band is interposed between a ceramic honeycomb structure and a case, it is easy for heat to be transmitted from the case to the honeycomb structure, and it is easy for the coolant (heat medium) to boil.

SUMMARY

An aspect of the present disclosure is an exhaust heat recovery unit, that includes: a heat exchanger that is provided inside an exhaust pipe through which exhaust gas flows, the heat exchange being formed from silicon carbide, and the heat exchanger performing heat exchange between the exhaust gas and a heat medium; and a retention member that is provided at the periphery of the heat exchanger, is formed of a ceramic sheet or an expandable graphite sheet, and is sandwiched between the exhaust pipe and the heat exchanger, thereby retaining the heat exchanger in the exhaust pipe.

DETAILED DESCRIPTION

An example of an embodiment pertaining to the present disclosure will be described below on the basis of the drawings.

(Exhaust Pipe Structure 10)

Figure 1:
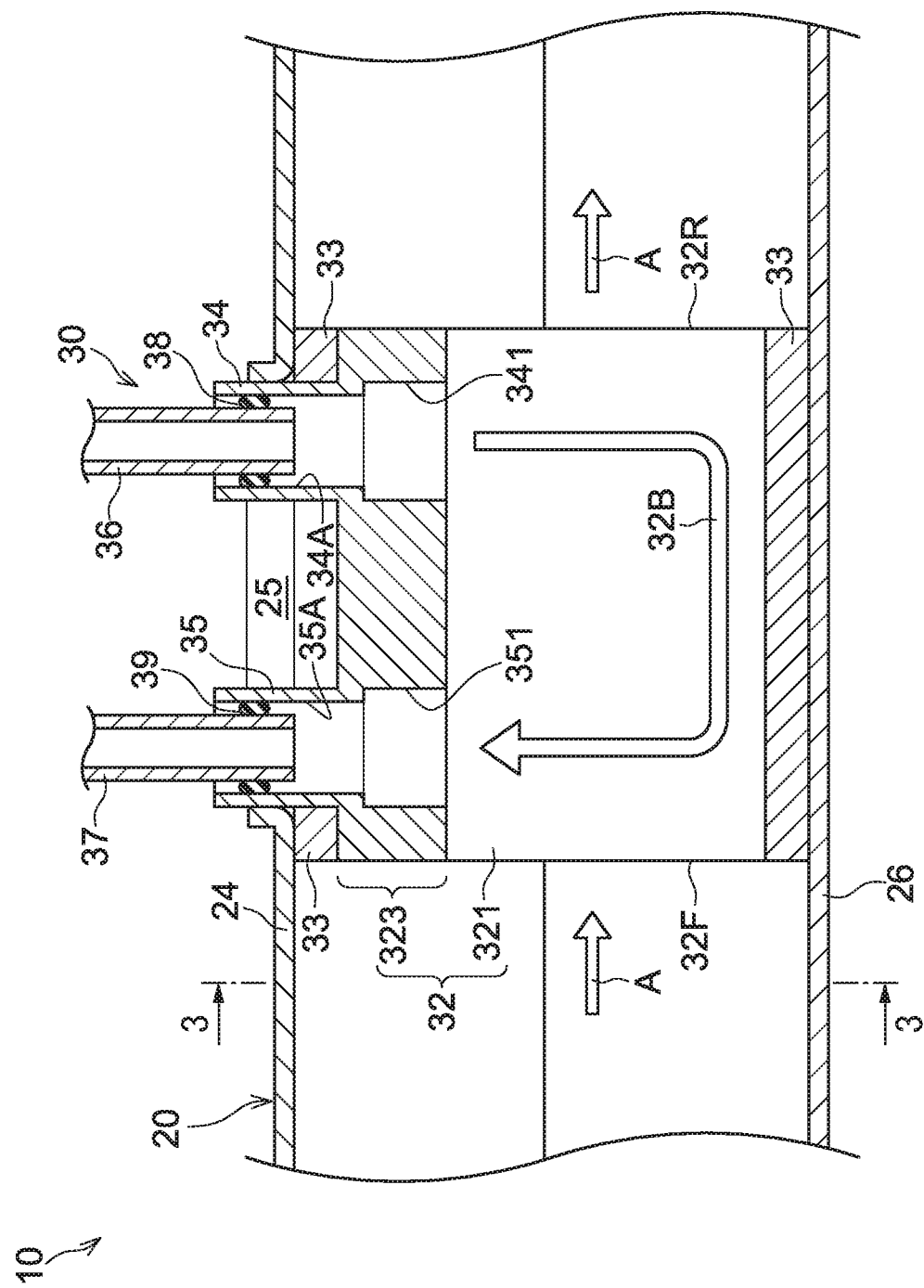
FIG. 1 is a sectional view showing the configuration of an exhaust pipe structure pertaining to an embodiment.

First, the configuration of an exhaust pipe structure 10 to which an exhaust heat recovery unit 30 pertaining to the present embodiment has been applied will be described. FIG. 1 is a sectional view of the exhaust pipe structure 10.

The exhaust pipe structure 10 is an exhaust pipe structure for a vehicle such as an automobile, and is a pipe structure for exhausting to the atmosphere (outside the vehicle) exhaust gas exhausted from the engine of the vehicle. Specifically, as shown in FIG. 1, the exhaust pipe structure 10 is equipped with an exhaust pipe 20 and the exhaust heat recovery unit 30.

Figure 3:
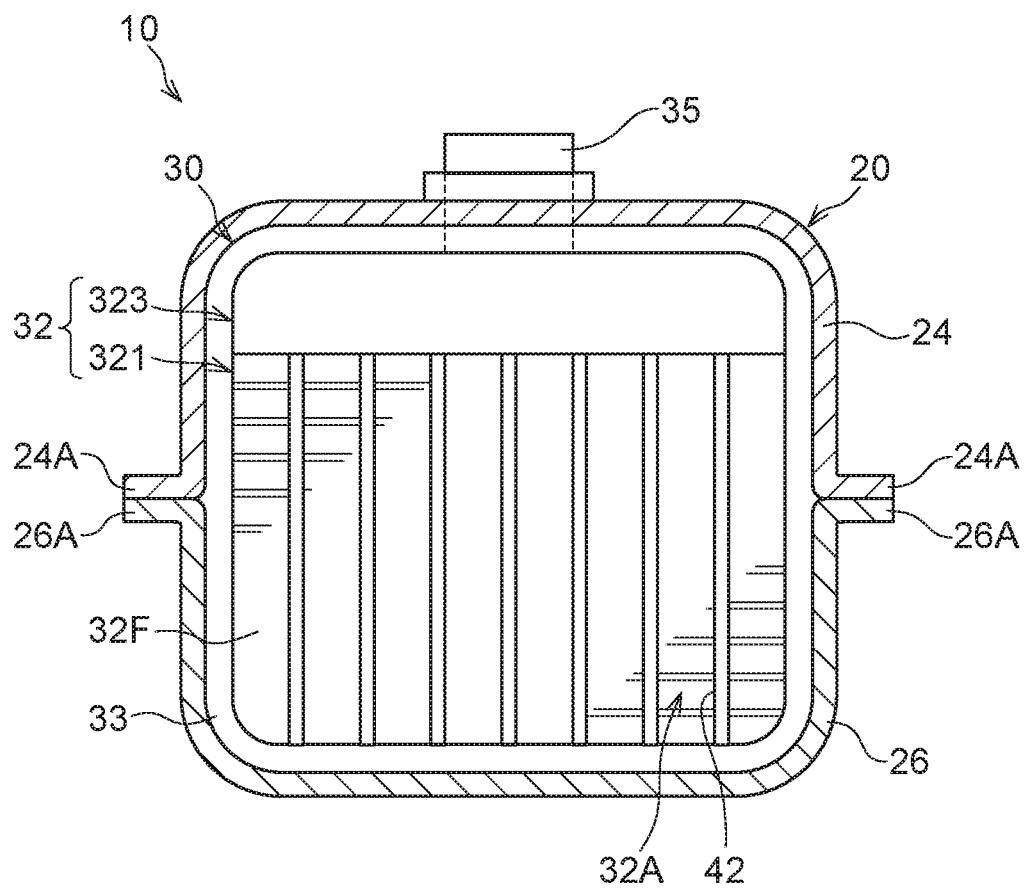
FIG. 3 is a sectional view (along line 3-3 of FIG. 1), looking in a gas flow direction (direction A), showing the configuration of the exhaust pipe structure pertaining to the embodiment.

The exhaust pipe 20 is configured by a tubular pipe (see FIG. 3), and the exhaust gas flows in one direction inside the exhaust pipe 20. In the drawings, the gas flow direction, which is the direction in which the exhaust gas flows, is indicated by the direction of arrows A. The exhaust pipe 20 is formed in a tubular shape as a result of vertically divided members being joined to each other by welding, for example. Specifically, as shown in FIG. 3, the exhaust pipe 20 has an upper member 24, which configures the upper portion of the exhaust pipe 20, and a lower member 26, which configures the lower portion of the exhaust pipe 20. The exhaust pipe 20 is formed in a tubular shape as a result of flange portions 24A and 26A that project laterally from the upper member 24 and the lower member 26, respectively, being joined to each other by welding, for example. The outer shape of the exhaust pipe 20 is configured to be a substantially rectangular shape. Specifically, the outer shape of the exhaust pipe 20 is configured to be a substantially rectangular shape whose corner portions are rounded.

As shown in FIG. 1, in the upper member 24 is formed an opening 25 into which a later-described inlet portion 34 and outlet portion 35 of the exhaust heat recovery unit 30 are inserted. It will be noted that the exhaust gas has a temperature in the range of 200° C. to 800° C., for example.

The exhaust heat recovery unit 30 has the function of exchanging heat between the exhaust gas flowing through the exhaust pipe 20 and a heat medium to thereby recover the heat of the exhaust gas and reutilize the heat. As the heat medium, for example, a coolant (long life coolant (LLC)) for cooling the engine is used. The heat medium has a temperature lower than the temperature of the exhaust gas. In the case of using a coolant as the heat medium, the temperature of the heat medium reaches about 130° C. at its highest, for example.

As shown in FIG. 1, the exhaust heat recovery unit 30 specifically has a heat exchanger 32, an inlet portion 34 and an outlet portion 35, a lead-in pipe 36, a lead-out pipe 37, O-rings 38 and 39, and a retention member 33.

The heat exchanger 32 is provided inside the exhaust pipe 20 and has the function of exchanging heat between the exhaust gas flowing through the inside of the exhaust pipe 20 and the heat medium. Specifically, the heat exchanger 32 has a heat exchanger body 321 and a flow passage forming portion 323 in which an inflow passage 341 and an outflow passage 351 are formed.

The flow passage forming portion 323 is integrally provided in the upper surface of the heat exchanger body 321. The inflow passage 341 allows the heat medium from the inlet portion 34 to flow therethrough toward the near side of the page in FIG. 1 (direction −D in FIG. 2) and the far side of the page in FIG. 1 (direction +D in FIG. 2) at the upper surface of the heat exchanger body 321. The outflow passage 351 allows the heat medium from the heat exchanger body 321 to flow therethrough toward the far side of the page in FIG. 1 (direction –E in FIG. 2) and the near side of the page in FIG. 1 (direction +E in FIG. 2) to the outlet portion 35 at the upper surface of the heat exchanger body 321. It will be noted that when the engine of the vehicle is stopped, the heat medium does not flow into the inlet portion 34, and the flow of the heat medium inside the heat exchanger body 321 stops.

Figure 2:
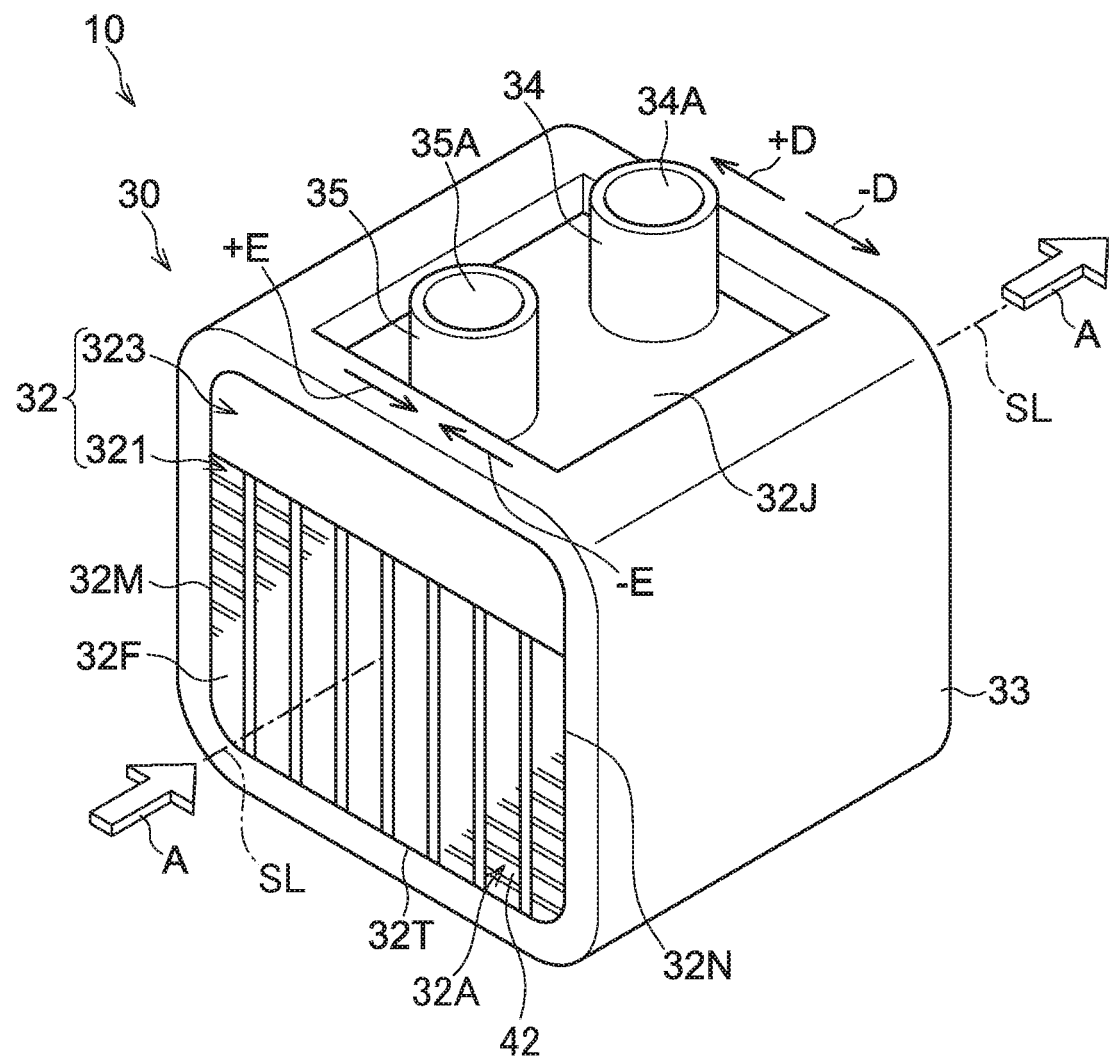
FIG. 2 is a perspective view showing the configuration of an exhaust heat recovery unit pertaining to the embodiment.

As shown in FIG. 2, in the heat exchanger body 321 are formed plural gas flow passages 32A that allow the exhaust gas to flow therethrough along the direction of arrows A from a side surface 32F to a side surface 32R (see FIG. 1) of the heat exchanger body 321. The gas flow passages 32A have inflow openings 42, into which the exhaust gas flows, and outflow openings, from which the exhaust gas flows out.

The gas flow passages 32A are arranged two-dimensionally (grid-like) as seen from the direction of arrows A. The inflow openings 42 and the outflow openings of the gas flow passages 32A are arranged two-dimensionally in the side surface 32F and the side surface 32R (see FIG. 1), respectively. The side surface 32F is a surface of the heat exchanger 32 that faces upstream in the gas flow direction. The side surface 32R is a surface of the heat exchanger 32 that faces downstream in the gas flow direction.

Moreover, as shown in FIG. 1, inside the heat exchanger body 321 are formed plural medium flow passages 32B that allow the heat medium to flow therethrough from the inflow passage 341 (the inlet portion 34) toward the outflow passage 351 (the outlet portion 35). The plural medium flow passages 32B are disposed alternating with the plural gas flow passages 32A and are partitioned from the gas flow passages 32A by partition walls. Additionally, heat exchange takes place, via the partition walls, between the heat medium flowing through the medium flow passages 32B and the exhaust gas flowing through the gas flow passages 32A.

Furthermore, the heat exchanger 32, including the heat exchanger body 321 and the flow passage forming portion 323, is formed of silicon carbide. Silicon carbide is superhard, resistant to heat, and resistant to wear.

The inlet portion 34 is an open portion for leading the heat medium into the inside (the inflow passage 341) of the heat exchanger 32. The inlet portion 34 is formed of silicon carbide integrally with the flow passage forming portion 323 of the heat exchanger 32. Specifically, as shown in FIG. 1, the inlet portion 34 extends upward from the upper end portion (the upper part of the inflow passage 341) of the gas flow direction (direction A) downstream-side part of the flow passage forming portion 323 of the heat exchanger 32. Moreover, the distal end portion of the inlet portion 34 projects outward in the radial direction of the exhaust pipe 20 through the opening 25 in the upper member 24 of the exhaust pipe 20. A lead-in passage 34A that communicates with the inflow passage 341 is formed in the inlet portion 34.

The outlet portion 35 is an open portion for leading the heat medium out from the inside (the outflow passage 351) of the heat exchanger 32. The outlet portion 35 is formed of silicon carbide integrally with the flow passage forming portion 323 of the heat exchanger 32. Specifically, as shown in FIG. 1, the outlet portion 35 extends upward from the upper end portion of the gas flow direction (direction A) upstream-side part of the flow passage forming portion 323 of the heat exchanger 32. Moreover, the distal end portion of the outlet portion 35 projects outward in the radial direction of the exhaust pipe 20 through the opening 25 in the upper member 24 of the exhaust pipe 20. A lead-out passage 35A that communicates with the outflow passage 351 is formed in the outlet portion 35.

As mentioned above, the distal end portions of the inlet portion 34 and the outlet portion 35 project outward of the exhaust pipe 20, and the space on the inside (inner surface side) of the inlet portion 34 and the space on the inside (inner surface side) of the outlet portion 35 are isolated from the internal space of the exhaust pipe 20. In the way described above, in the present embodiment, a pair of open portions formed in the heat exchanger 32 are configured by the inlet portion 34 and the outlet portion 35.

Furthermore, in the present embodiment, as mentioned above, the heat exchanger 32 including the heat exchanger body 321 and the flow passage forming portion 323, the inlet portion 34, and the outlet portion 35 are integrally formed of silicon carbide. Specifically, the heat exchanger 32, the inlet portion 34, and the outlet portion 35 are formed, for example, by impregnating a porous body with metallic silicon.

The lead-in pipe 36 is a lead-in pipe that leads the heat medium from the outside of the exhaust pipe 20 via the inlet portion 34 into the heat exchanger 32. The downstream end portion (lower end portion) of the lead-in pipe 36 is connected to the inlet portion 34. Specifically, the downstream end portion of the lead-in pipe 36 is inserted into the inlet portion 34.

The O-ring 38 is disposed on the inside of the inlet portion 34 between the inlet portion 34 and the lead-in pipe 36. Specifically, the O-ring 38 is disposed between the outer surface of the lead-in pipe 36 and the inner surface of the inlet portion 34 and seals the space between the outer surface of the lead-in pipe 36 and the inner surface of the inlet portion 34. More specifically, the O-ring 38 seals the space between the outer surface of the lead-in pipe 36 and the inner surface of the inlet portion 34 in a position on the radial direction outer side (upper side) of the exhaust pipe 20.

In this way, the O-ring 38 is disposed on the inside of the inlet portion 34, so the O-ring 38 contacts the heat medium that is lower in temperature than the exhaust gas but does not contact the exhaust gas flowing through the exhaust pipe 20. That is, the O-ring 38 is disposed in a position in which it does not contact the exhaust gas flowing through the exhaust pipe 20 and in which it contacts the heat medium.

The O-ring 38 is configured in the shape of a ring with a circular cross section (see JIS B 0142) and, for example, is formed of an elastic resin material. The O-ring 38 is disposed between the outer surface of the lead-in pipe 36 and the inner surface of the inlet portion 34 in a state in which it is compressively (elastically) deformed in the radial direction.

The lead-out pipe 37 is a lead-out pipe that leads the heat medium out from the heat exchanger 32 via the outlet portion 35 to the outside of the exhaust pipe 20. The upstream end portion (lower end portion) of the lead-out pipe 37 is connected to the outlet portion 35. Specifically, the upstream end portion of the lead-out pipe 37 is inserted into the outlet portion 35.

The O-ring 39 is disposed on the inside of the outlet portion 35 between the outlet portion 35 and the lead-out pipe 37. Specifically, the O-ring 39 is disposed between the outer surface of the lead-out pipe 37 and the inner surface of the outlet portion 35 and seals the space between the outer surface of the lead-out pipe 37 and the inner surface of the outlet portion 35. More specifically, the O-ring 39 seals the space between the outer surface of the lead-out pipe 37 and the inner surface of the outlet portion 35 in a position on the radial direction outer side (upper side) of the exhaust pipe 20.

In this way, the O-ring 39 is disposed on the inside of the outlet portion 35, so the O-ring 39 contacts the heat medium that is lower in temperature than the exhaust gas but does not contact the exhaust gas flowing through the exhaust pipe 20. That is, the O-ring 39 is disposed in a position in which it does not contact the exhaust gas flowing through the exhaust pipe 20 and in which it contacts the heat medium.

The O-ring 39 is configured in the shape of a ring with a circular cross section (see JIS B 0142) and, for example, is formed of an elastic resin material. The O-ring 39 is disposed between the outer surface of the lead-out pipe 37 and the inner surface of the outlet portion 35 in a state in which it is compressively (elastically) deformed in the radial direction. In the way described above, in the present embodiment, a pair of seal members that seal the space between the inlet portion 34 and the lead-in pipe 36 and the space between the outlet portion 35 and the lead-out pipe 37 are configured by the O-rings 38 and 39.

As shown in FIG. 2, the retention member 33 is disposed on the periphery of the heat exchanger 32 around a virtual line SL along the gas flow direction (direction A). Specifically, the retention member 33 is disposed in contact with side surfaces 32M and 32N, a bottom surface 32T, and an upper surface 32J of the heat exchanger 32. That is, as shown in FIG. 3, the retention member 33 is disposed in a substantially rectangular tube shape so as to surround the virtual line SL. Specifically, the retention member 33 is disposed in a rectangular tube shape whose corner portions are rounded.

Furthermore, the retention member 33 is disposed on the entireties of the side surfaces 32M and 32N and the bottom surface 32T of the heat exchanger 32. At the upper surface 32J of the heat exchanger 32, the retention member 33 is formed in the shape of a frame surrounding the inlet portion 34 and the outlet portion 35 as seen in a plan view (see FIG. 2).

Consequently, the retention member 33 is disposed on the periphery of the heat exchanger 32 around the virtual line SL along the gas flow direction (direction A), on the gas flow direction upstream side and downstream side of the inlet portion 34 and the outlet portion 35.

Additionally, the retention member 33 is disposed in a state in which it is sandwiched between the inner peripheral surface of the exhaust pipe 20 and the side surfaces 32M and 32N, the bottom surface 32T, and the upper surface 32J of the heat exchanger 32. Specifically, the retention member 33 is disposed in a compressively deformed state between the inner peripheral surface of the exhaust pipe 20 and the side surfaces 32M and 32N, the bottom surface 32T, and the upper surface 32J of the heat exchanger 32.

In this way, the retention member 33, by virtue of being sandwiched between the exhaust pipe 20 and the heat exchanger 32, retains the heat exchanger 32 in the exhaust pipe 20. That is, the retention member 33 has a retaining function of retaining the heat exchanger 32 in the exhaust pipe 20.

Furthermore, because the retention member 33 is sandwiched between the exhaust pipe 20 and the heat exchanger 32, the space between the heat exchanger 32 and the exhaust pipe 20 is sealed. That is, the retention member 33 functions as a gas seal that suppresses ingress of the exhaust gas into the space between the heat exchanger 32 and the exhaust pipe 20.

Moreover, the retention member 33 is elastic and mitigates shock and vibration from the exhaust pipe 20 to the heat exchanger 32. That is, the retention member 33 also functions as a buffer member that provides a buffer between the heat exchanger 32 and the exhaust pipe 20.

The retention member 33 is formed of a ceramic sheet or an expandable graphite sheet. A ceramic sheet comprises ceramic fibers formed into a sheet. As the ceramic fibers, for example, silica-alumina fibers, alumina fibers, silica fibers, rock wool, and glass fibers can be used. An expandable graphite sheet comprises expandable graphite formed into a sheet. Examples thereof include GRAFOIL made by GrafTech. The thermal conductivity of a ceramic sheet is about 0.03 to 0.3 W/mk. The thermal conductivity of an expandable graphite sheet is about 1 to 10 W/mK. The thermal conductivity of the heat exchanger 32 formed mainly of silicon carbide is about 100 to 300 W/mK, and the thermal conductivities of a ceramic sheet and an expandable graphite sheet are lower than that of the heat exchanger 32 comprising silicon carbide.

Action and Effects of Present Embodiment

Next, the action and effects of the present embodiment will be described.

According to the exhaust heat recovery unit 30 pertaining to the present embodiment, the heat medium is led by the lead-in pipe 36 from the outside of the exhaust pipe 20 via the lead-in passage 34A of the inlet portion 34 into the inflow passage 341 of the heat exchanger 32 (see FIG. 1). The heat medium that has been led into the inflow passage 341 flows through the medium flow passages 32B of the heat exchanger body 321. Meanwhile, the exhaust gas inside the exhaust pipe 20 flows through the gas flow passages 32A of the heat exchanger body 321. Additionally, the heat medium flowing through the medium flow passages 32B of the heat exchanger body 321 exchanges heat with the exhaust gas flowing through the gas flow passages 32A. The heat medium that has exchanged heat with the exhaust gas flows through the outflow passage 351 of the heat exchanger 32 and the lead-out passage 35A of the outlet portion 35 and is thereafter led out by the lead-out pipe 37 to the outside of the exhaust pipe 20. Because of this, the heat of the exhaust gas flowing through the exhaust pipe 20 is recovered. This heat is reutilized outside the exhaust pipe 20.

Here, in the embodiment, the retention member 33 sandwiched between the heat exchanger 32 and the exhaust pipe 20 is formed of a ceramic sheet or an expandable graphite sheet whose thermal conductivity is lower than that of silicon carbide.

For example, in the case of a configuration (comparative example 1) where the heat exchanger 32 is retained in the exhaust pipe 20 by a metal member interposed between the heat exchanger 32 and the exhaust pipe 20, or in the case of a configuration (comparative example 2) where a heat exchanger 32 made of metal is retained in the exhaust pipe 20 by welding, for example, it is easy for heat to be transmitted from the exhaust pipe 20 to the heat exchanger 32. This is because the configurations of comparative example 1 and comparative example 2 thermally are not much different from a state in which the heat exchanger 32 and the exhaust pipe 20 directly contact each other.

Particularly in a case where the engine has been stopped after high-load travel, there is the concern that, when the heat of the exhaust pipe 20 that has reached a high temperature because of the exhaust gas at the time of high-load travel is transmitted to the heat exchanger 32, the heat medium that stopped flowing when the engine stopped will boil.

In contrast, in the present embodiment, as described above, a ceramic sheet or an expandable graphite sheet whose thermal conductivity is lower than that of the silicon carbide forming the heat exchanger 32 is used as the retention member 33, so compared to comparative example 1 and comparative example 2, it is difficult for the heat of the exhaust gas to be transmitted from the exhaust pipe 20 to the heat exchanger 32. Because of this, boiling of the heat medium caused by heat from the exhaust pipe 20 being transmitted to the heat exchanger 32 can be suppressed.

Consequently, even in a state in which the exhaust pipe 20 has reached a high temperature because of the exhaust gas at the time of high-load travel and the heat medium is not flowing inside the heat exchanger 32, boiling of the heat medium caused by heat from the exhaust pipe 20 being transmitted to the heat exchanger 32 can be suppressed.

Furthermore, in the present embodiment, the retention member 33 is disposed on the periphery of the heat exchanger 32 around the virtual line SL along the flow direction of the exhaust gas. For this reason, the retention member 33 keeps the exhaust gas from flowing between the heat exchanger 32 and the exhaust pipe 20, and the exhaust gas can be guided to the inflow openings 42. Because of this, the amount of exhaust gas guided to the heat exchanger 32 increases and the heat exchange efficiency is improved.

Moreover, in the present embodiment, the retention member 33 is disposed on the periphery of the heat exchanger 32 around the virtual line SL along the flow direction of the exhaust gas, on the exhaust gas flow direction upstream side and downstream side of the inlet portion 34 and the outlet portion 35.

For this reason, the exhaust gas can be kept from flowing in toward the inlet portion 34 and the outlet portion 35 from the exhaust gas flow direction upstream side and downstream side of the inlet portion 34 and the outlet portion 35.

Example Modifications

In the present embodiment, a coolant is used as the heat medium, but the heat medium is not limited to this. As the heat medium, an automatic transmission fluid (ATF) or a continuously variable transmission (CTV) fluid may be used, and fluids such as liquids and gases used in heat exchange can be widely applied.

Furthermore, in the embodiment, the retention member 33 is disposed in a substantially rectangular shape so as to surround the virtual line SL, but the retention member 33 is not limited to this. For example, the retention member 33 may also have a configuration where it is disposed in a substantially circular shape about the virtual line SL. That is, the retention member 33 may be disposed in any shape so long as the configuration where the retention member 33 is disposed on the periphery of the heat exchanger 32 around the virtual line SL is a configuration where the retention member 33 is disposed so as to surround the virtual line SL.

The present disclosure is not limited to the above embodiment and can be modified, changed, and improved in various ways in a range that does not depart from the spirit thereof.

It is an object of the present disclosure to obtain an exhaust heat recovery unit that can suppress boiling of the heat medium caused by heat from the exhaust pipe being transmitted to the heat exchanger.

A first aspect of the present disclosure is an exhaust heat recovery unit that includes: a heat exchanger that is provided inside an exhaust pipe through which exhaust gas flows, the heat exchange being formed from silicon carbide, and the heat exchanger performing heat exchange between the exhaust gas and a heat medium; and a retention member that is provided at the periphery of the heat exchanger, is formed of a ceramic sheet or an expandable graphite sheet, and is sandwiched between the exhaust pipe and the heat exchanger, thereby retaining the heat exchanger in the exhaust pipe.

A ceramic sheet comprises ceramic fibers formed into a sheet. As the ceramic fibers, for example, silica-alumina fibers, alumina fibers, silica fibers, rock wool, and glass fibers can be used. An expandable graphite sheet comprises expandable graphite formed into a sheet. Examples thereof include GRAFOIL made by GrafTech.

According to the exhaust heat recovery unit of the first aspect, in the heat exchanger, heat exchange takes place between the exhaust gas flowing through the exhaust pipe and the heat medium. Furthermore, the retention member provided on the periphery of the heat exchanger is sandwiched between the exhaust pipe and the heat exchanger and thereby retains the heat exchanger in the exhaust pipe.

Here, in the configuration of the first aspect, a ceramic sheet or an expandable graphite sheet whose thermal conductivity is lower than that of silicon carbide forming the heat exchanger is used as the retention member. For this reason, it is difficult for the heat of the exhaust gas to be transmitted from the exhaust pipe to the heat exchanger. Because of this, boiling of the heat medium caused by heat from the exhaust pipe being transmitted to the heat exchanger can be suppressed.

A second aspect is the exhaust heat recovery unit of the first aspect, wherein: the heat exchanger has inflow openings at a surface of the heat exchanger that faces upstream in a flow direction of the exhaust gas, and the heat exchanger performs heat exchange between exhaust gas flowing in through the inflow openings and the heat medium, and the retention member is disposed at the periphery of the heat exchanger around a virtual line along the flow direction of the exhaust gas.

According to the exhaust heat recovery unit of the second aspect, the heat exchanger has the inflow openings formed in the surface of the heat exchanger that faces upstream in the flow direction of the exhaust gas, and the heat exchanger exchanges heat between the exhaust gas flowing in from the inflow openings and the heat medium.

Here, in the configuration of the second aspect, the retention member is disposed on the periphery of the heat exchanger around the virtual line along the flow direction of the exhaust gas. For this reason, the retention member keeps the exhaust gas from flowing between the heat exchanger and the exhaust pipe, and the exhaust gas can be guided to the inflow openings. Because of this, the amount of exhaust gas guided to the heat exchanger increases and the heat exchange efficiency is improved.

It will be noted that the configuration where the retention member is disposed on the periphery of the heat exchanger around the virtual line is not limited to a configuration where the retention member is disposed in a circular shape about the virtual line and, for example, may also be a configuration where the retention member is disposed in a rectangular shape so as to surround the virtual line. It suffices for the configuration to be one where the retention member is disposed so as to surround the virtual line.

A third aspect is the heat exchanger of the second aspect, further includes: an inlet portion that is provided at the heat exchanger and that leads the heat medium into the heat exchanger; and an outlet portion that is provided at the heat exchanger and that leads the heat medium out from the heat exchanger, wherein the retention member is disposed at the periphery of the heat exchanger around a virtual line along the flow direction of the exhaust gas, at the exhaust gas flow direction upstream side and downstream side of the inlet portion and of the outlet portion.

According to the exhaust heat recovery unit of the third aspect, the heat medium is led into the heat exchanger through the inlet portion formed in the heat exchanger. Furthermore, the heat medium is led out from the heat exchanger through the outlet portion formed in the heat exchanger.

In the configuration of the third aspect, the retention member is disposed on the periphery of the heat exchanger around the virtual line along the flow direction of the exhaust gas on the exhaust gas flow direction upstream side and downstream side of the inlet portion and the outlet portion.

For this reason, the exhaust gas can be kept from flowing in toward the inlet portion and the outlet portion from the exhaust gas flow direction upstream side and downstream side of the inlet portion and the outlet portion.

The present disclosure can suppress boiling of the heat medium caused by heat from the exhaust pipe being transmitted to the heat exchanger.

What is claimed is:

1. An exhaust heat recovery unit, comprising:
    a heat exchanger that is provided inside an exhaust pipe through which exhaust gas flows, the heat exchanger being formed from silicon carbide, and the heat exchanger performing heat exchange between the exhaust gas and a heat medium; and
    a retention member that is provided at the periphery of the heat exchanger, is formed of a ceramic sheet, and is sandwiched between the exhaust pipe and the heat exchanger, thereby retaining the heat exchanger in the exhaust pipe; wherein
    the thermal conductivity of the ceramic sheet is 0.03 to 0.3 W/mK.

2. The exhaust heat recovery unit according to claim 1, wherein:
    the heat exchanger has inflow openings at a surface of the heat exchanger that faces upstream in a flow direction of the exhaust gas, and the heat exchanger performs heat exchange between exhaust gas flowing in through the inflow openings and the heat medium, and
    the retention member is disposed at the periphery of the heat exchanger around a virtual line along the flow direction of the exhaust gas.

3. The heat exchanger according to claim 2, further comprising:
    an inlet portion that is provided at the heat exchanger and that leads the heat medium into the heat exchanger; and
    an outlet portion that is provided at the heat exchanger and that leads the heat medium out from the heat exchanger,
    wherein the retention member is disposed at the periphery of the heat exchanger around a virtual line along the flow direction of the exhaust gas, at the exhaust gas flow direction upstream side and downstream side of the inlet portion and of the outlet portion.

4. The exhaust heat recovery unit according to claim 2, wherein the retention member is disposed in a rectangular shape at the periphery of the heat exchanger around the virtual line.

* * * * *